US006302293B1

(12) United States Patent
Wittern, Jr. et al.

(10) Patent No.: US 6,302,293 B1
(45) Date of Patent: Oct. 16, 2001

(54) VERTICAL STACK RETAINER FOR VENDING MACHINES

(75) Inventors: Francis A. Wittern, Jr., Des Moines; Paul L. Hawkins, Guthrie Center, both of IA (US)

(73) Assignee: Inland Finance Company, Des Moines, IA (US)

( * ) Notice: Subject to any disclaimer, the term of this patent is extended or adjusted under 35 U.S.C. 154(b) by 0 days.

(21) Appl. No.: 09/293,388

(22) Filed: Apr. 16, 1999

(51) Int. Cl.[7] .............................. B65G 59/00; B65H 1/00; G07F 11/00

(52) U.S. Cl. ............................ 221/92; 221/125; 221/154; 221/281

(58) Field of Search .............................. 221/92, 100, 101, 221/125, 154, 197, 281

(56) References Cited

U.S. PATENT DOCUMENTS

| | | | | |
|---|---|---|---|---|
| 1,367,081 | | 2/1921 | Olson . | |
| 1,461,332 | * | 7/1923 | Schoepe | 221/154 |
| 1,503,585 | | 8/1924 | Headley et al. . | |
| 1,524,588 | * | 1/1925 | Spear | 221/154 X |
| 1,767,634 | * | 6/1930 | Weiss | 221/154 |
| 2,537,300 | | 1/1951 | Casey et al. . | |
| 2,642,328 | * | 6/1953 | Nystedt | 221/281 X |
| 2,661,991 | * | 12/1953 | Petrecca | 221/281 X |
| 2,785,828 | | 3/1957 | Patzer . | |
| 2,836,326 | | 5/1958 | Childers . | |
| 2,906,434 | * | 9/1959 | Goodman | 221/281 X |
| 2,932,427 | | 4/1960 | Van Brunt . | |
| 3,026,002 | | 3/1962 | Torres . | |
| 3,055,548 | * | 9/1962 | Allegri | 221/281 |
| 3,125,246 | | 3/1964 | Barnhart . | |
| 3,158,289 | | 11/1964 | Van Brunt . | |
| 3,342,373 | * | 9/1967 | Weitzman | 221/154 X |
| 3,737,070 | | 6/1973 | O'Neal . | |
| 3,737,071 | | 6/1973 | Offutt et al. . | |
| 3,753,514 | | 8/1973 | Naguet . | |
| 3,828,971 | | 8/1974 | Offutt et al. . | |
| 3,883,038 | | 5/1975 | Bookout . | |
| 3,894,656 | | 7/1975 | Hunter . | |
| 4,043,483 | | 8/1977 | Gore et al. . | |
| 4,096,969 | | 6/1978 | Ragusa . | |
| 4,120,393 | | 10/1978 | Motooka et al. . | |
| 4,164,279 | | 8/1979 | Dubuit . | |
| 4,190,179 | | 2/1980 | Moss et al. . | |
| 4,405,059 | | 9/1983 | Kull . | |
| 4,460,107 | | 7/1984 | Lindsey . | |
| 4,542,834 | | 9/1985 | Kurosawa et al. . | |
| 4,574,980 | | 3/1986 | Kurosawa et al. . | |
| 4,676,398 | | 6/1987 | Kokubun et al. . | |

(List continued on next page.)

FOREIGN PATENT DOCUMENTS

| | | |
|---|---|---|
| 226094 | 9/1989 | (JP) . |
| 405046862 | 2/1993 | (JP) . |
| 405089346A | 4/1993 | (JP) . |
| 6176261 | 6/1994 | (JP) . |

*Primary Examiner*—Christopher P. Ellis
*Assistant Examiner*—Gene O. Crawford
(74) *Attorney, Agent, or Firm*—Zarley, McKee, Thomte, Voorhees & Sease

(57) ABSTRACT

The apparatus and method for retaining a vertical stack or stacks of vendable items in a vending machine includes a column having sidewalls and a front and back. The back is substantially blocked to retain vendable items vertically at the back of the column. The front of the column is substantially blocked to maintain vertical the vendable items in the front of the column. The front of the column can be substantially unblocked for access through the front of the column to other parts of the column. In one form, a door or retainer can be positioned so that it is closed and latched across the front of the column but releasable and openable to substantially expose the front of the column.

25 Claims, 10 Drawing Sheets

U.S. PATENT DOCUMENTS

| | | | | |
|---|---|---|---|---|
| 4,757,915 | | 7/1988 | Albright et al. . | |
| 4,940,161 | | 7/1990 | Hieb . | |
| 4,986,615 | | 1/1991 | Hieb et al. . | |
| 4,991,739 | | 2/1991 | Levasseur . | |
| 4,991,740 | | 2/1991 | Levasseur . | |
| 5,127,546 | | 7/1992 | Chen . | |
| 5,476,190 | * | 12/1995 | Herrman et al. | 221/197 |
| 5,529,207 | | 6/1996 | Oden et al. . | |
| 5,570,811 | | 11/1996 | Wittern, Jr. et al. . | |
| 5,588,555 | * | 12/1996 | Kanamori et al. | 221/197 |
| 5,647,507 | * | 7/1997 | Kasper | 221/197 X |
| 5,713,490 | | 2/1998 | Oden et al. . | |
| 5,791,516 | | 8/1998 | Wittern, Jr. et al. . | |
| 5,799,824 | | 9/1998 | Gasiel . | |
| 5,857,830 | * | 1/1999 | Harres et al. | 221/197 X |

* cited by examiner

VERTICAL STACK RETAINER FOR VENDING MACHINES

BACKGROUND OF THE INVENTION

1. Field of the Invention

This invention relates to vending machines, and in particular, to vending machines stocked with vertical stacks of vendable items, and further to vending machines with vertical stacks of containers in columns in a vending machine.

2. Problems in the Art

Vertical stacks are one way to store and dispense vendable items in vending machines. For certain items, this is an efficient and effective way to store a maximum number of vendable items. This is an important consideration in the field of vending. The more items that can be stored in the machine the less often is the need to restock.

An example of a vertical stack vending machine can be found at U.S. Pat. No. 5,791,516, issued Aug. 11, 1998 to inventors Wittern, et al., which is incorporated by reference herein.

It is becoming more difficult to produce vending machines that universally vend a variety of vendable items. A primary reason is the present availability of a much larger variety of shapes, sizes, and types of containers for the vendable items. For example, with respect to vendable drinks, there previously were predominately twelve-ounce cylindrical cans or 12 to 16 ounce glass bottles of substantially similar dimensions. Today can size and shapes may differ. However, differences are particularly prevalent with respect to bottles. Sizes can range up to one liter or more. Bottles may be plastic, glass or metal. They may have long necks or short necks. They may have slim necks or wide necks. Long necks, shorter necks or even longer or shorter overall dimensions exist. Different containers can even contain different footprints and crosssectional shapes.

Still further, consumers are demanding more selections. Marketing decisions by manufacturers and retailers are being made to present more selections to consumers.

To accommodate a wider variety of selections and container shapes may require separate column set-ups for each different size/type of product. This can be time consuming and labor intensive for the vending machine operator. It can also make the machines more expensive. It is better if minimal time is spent setting up, changing, or restocking machines. The quicker the operator can get from machine to machine, the better.

Most vending machines do not exceed as certain housing size. Therefore, due to size constraints, there are a limited number of columns per machine. One approach has been to place different products in the same column. For example, a front vertical stack of products could be all of one type. A second vertical stack of products of another type could be placed behind the first stack but in the same column. Of course, the two stacks could be of the same product. A controller would control the dispensing of the product from the correct stack in the column.

The foregoing describes the efficient use of space inside of vending machine by using the space from front to back in one column for different products. This would allow more selections of different products for each vending machine. However, one problem with this arrangement is restocking. There is a need to have separation between forward and rearward vertical stacks in the column and maintenance of the stacks in their generally vertical orientation for smooth dispensing. There is normally a back wall, a middle separator, and a front retainer. To allow restocking of the back vertical stack, the middle separator must provide enough space for the vending machine operator to reach through from front to back in the column. The middle separator conventionally comprises flanges or pieces extending inwardly from sidewalls of the column towards each other. This middle separator needs to extend inwardly far enough to hold the vertical stack vertical, yet allow the reach-through. The back wall can generally be solid across because there is no need to reach past the back wall.

However, the front retainer cannot be solid across the front of the column and at the same time allow a reach-through. U.S. Pat. No. 5,529,207 shows inwardly extending members at the front of the column. They extend far enough inwardly to hold the front vertical stack vertical, but leave a large enough opening for a reach through. U.S. Pat. No. 5,529,207 also discloses that these retainers can be adjustable forwardly or rearwardly for different size containers. They still have inward extension but enough opening to reach through.

Other attempts use a web, net, bar, or screen that extends across the fronts of all columns. When restocking, the web, net, bar or screen is retracted from all columns to get access thereto. These sort of devices serve only to retain items in the forward most vertical stacks from falling out once the door to the vending machine is open. They do not assist very much in maintaining the front stack vertically for smooth dispensing and to deter wedging or misalignments that could deter smooth dispension. Therefore, there is room for improvement in the art.

It is therefore principal object, feature and advantage of the present invention to provide a retainer for a vertical stacked vending machine that improves over or solves at least some of the problems and deficiencies in the art.

Other objects, features, and advantages of the invention include an apparatus and method as previously described which:

(1) holds and maintains the front most vertical stack vertical;
(2) retains the front most stacked vertical yet is adjustable forwardly or rearwardly for different size or types of containers;
(3) extends substantially across the entire vertical stack when in a first position yet allows almost complete access across the column when in a second position;
(4) is economical and efficient; and
(5) is durable.

These and other objects, features, and advantages of the present invention will become more apparent with reference to the accompanying specification and claims.

SUMMARY OF THE INVENTION

The present invention relates to an apparatus and method for retaining vertical stacks of vendable containers in a column or columns of a vending machine. The apparatus includes a column defined by spaced apart vertical sidewalls. A retainer member extends substantially across the front of the column in a first position to maintain a stack of vendable items vertically. The member is movable from the first position to a second position to substantially open access across the column to allow restocking, maintenance, and other tasks by allowing the vending operator to reach through the front of the column to the rear column.

The retainer can be used in combination with one or more columns in a vending machine including a housing, and other conventional operating components such as a controller and dispensing mechanism. Each column has a retainer member that can be independently moved between first and second positions.

The method according to the invention includes substantially blocking the front of a column of a vertical stack of vendable items during storage and dispensing of the items in a vending machine, and substantially unblocking the front of the column for reloading or maintenance of any part of the column.

DETAILED DESCRIPTION OF THE PREFERRED EMBODIMENT

Figure 1:
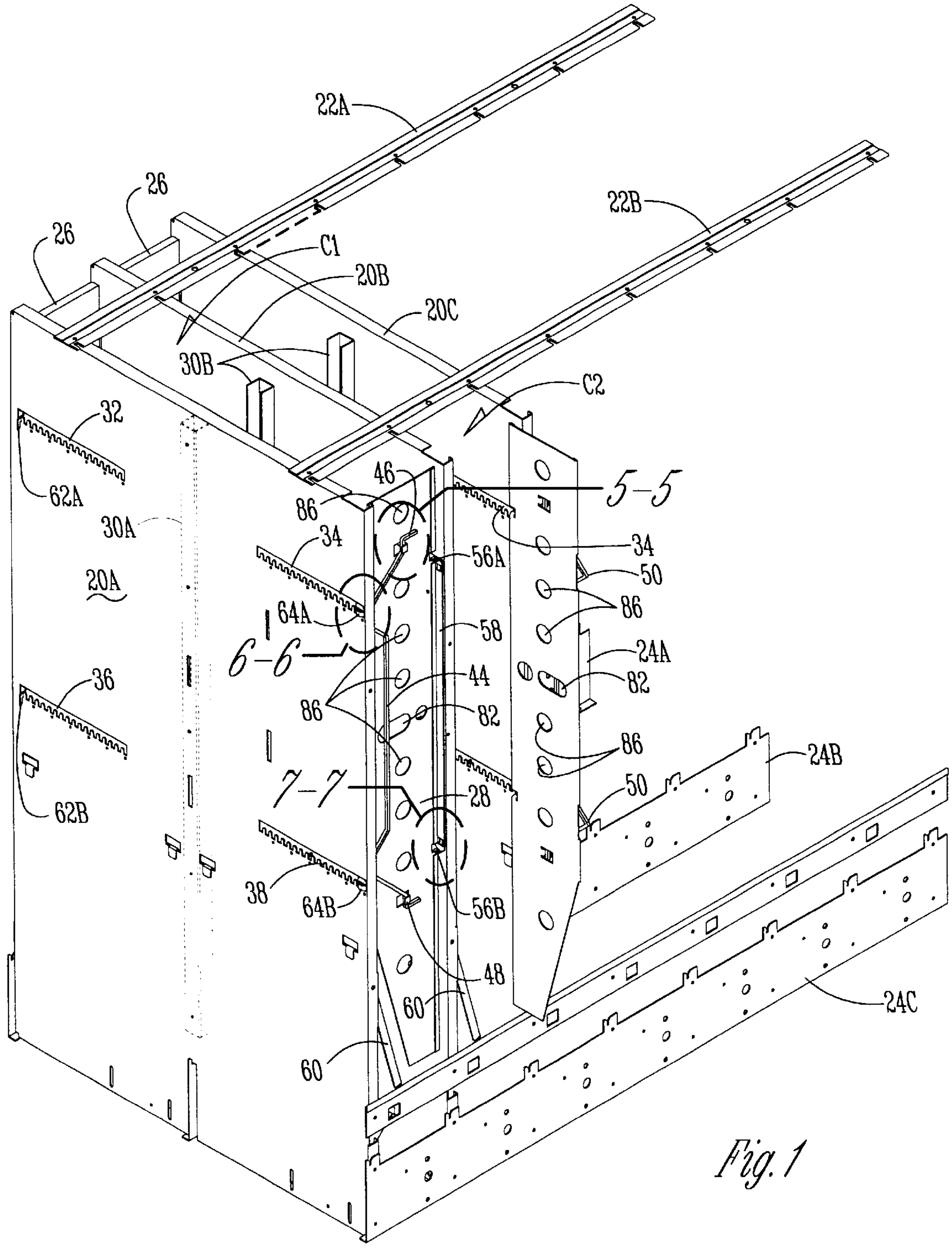
FIG. 1 is an isolated perspective view of several vertical columns for holding vendable containers in a vending machine.

To gain a better understanding of the invention, a preferred embodiment of the invention will now be described in detail. Frequent reference will be taken to the drawings.

Reference numbers will be utilized in the drawings to indicate certain parts and locations. The same reference numbers will be used to indicate the same parts and locations throughout the drawings unless otherwise indicated.

The general environment for the invention is in a conventional vending machine using vertical columns. Items to be vended are vertically stacked in the vertical columns. By mechanisms well known in the art, lower-most items out of each vertical stack in each column are called for and released by gravity to a dispensing location. Details of control of such vending machines and dispensing of such vending machines are well known in the art, and will not be discussed here.

Vertical columns are established in the vending machine housing as shown in FIG. 1. A plurality of vertical sidewalls 20A, 20B, 20C, etc., are maintained in generally parallel spaced-apart relationship by top frame members 22A and 22B, and bottom frame members 24A, 24B, and 24C. Only sidewalls 20A–C are shown in FIG. 1 define two columns. But as can be seen, up to eight sidewalls can be held in place by top and bottom frame members 22 and 24 which would define seven columns. FIG. 1 also illustrates that each column can also include a back wall 26 which extends across the back end of the column, a front retainer 28 which extends across the front of the column, and middle separators 30A and 30B mounted on the inside of adjacent sidewalls. Note that the framework 22A and B, 24A, B, and C, sidewalls 20, and other structure (unless otherwise specifically discussed) are connected in conventional manners (e.g. bolts, welding, etc.).

Figure 1A:
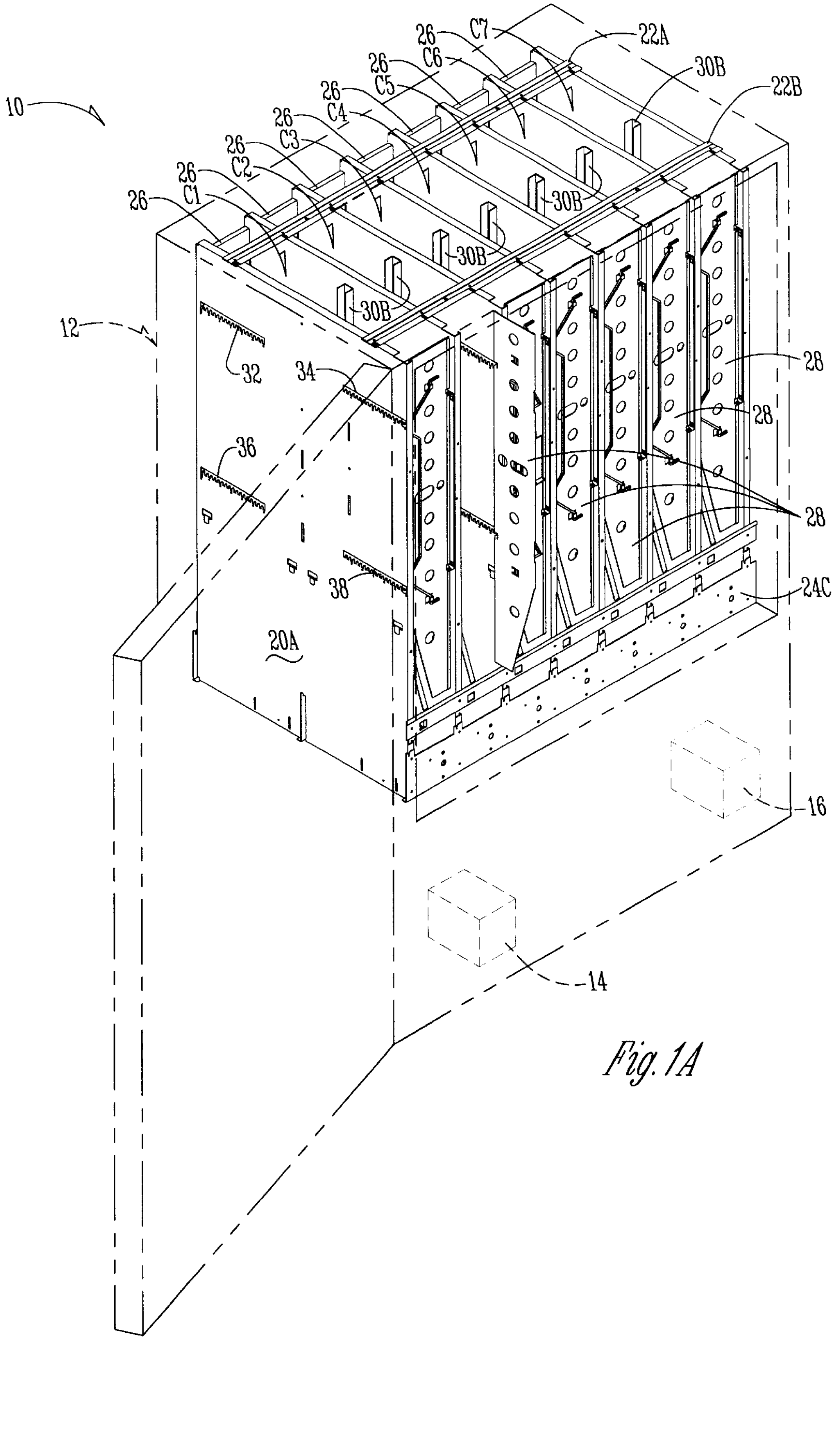
FIG. 1A is a reduced in size view of multiple columns such as shown in FIG. 1 inside a vending machine (shown in ghost lines).

FIG. 1A depicts a vending machine 10 including a housing 12. Inside housing 12 is positioned the structure of FIG. 1, including sidewalls 20A–H and seven columns designated by C1, C2, C3, C4, C5, C6 and C7. FIGS. 1 and 1A illustrate how front retainer 28 is in a first or closed position in column Cl. Column C2 is shown with retainer 28 open for access to the interior of column C2.

Vending machine at 10 includes other conventional elements such as a controller device 14 and a dispenser mechanism 16 (both shown diagrammatically). A lockable door 18 is operable to allow access to the columns inside machine 10. Details of these types of devices are well known and will not be described in detail here. Other components can be included in vending machine 10, including, but not limited to, electric meters and circuiting, refrigeration systems, lighting, bill changers, money or token handlers, and selection mechanisms. These types of components are well known in the art. Machines 10 could also be connected in a slave/master arrangement with other machines such as is well known.

Figure 2:
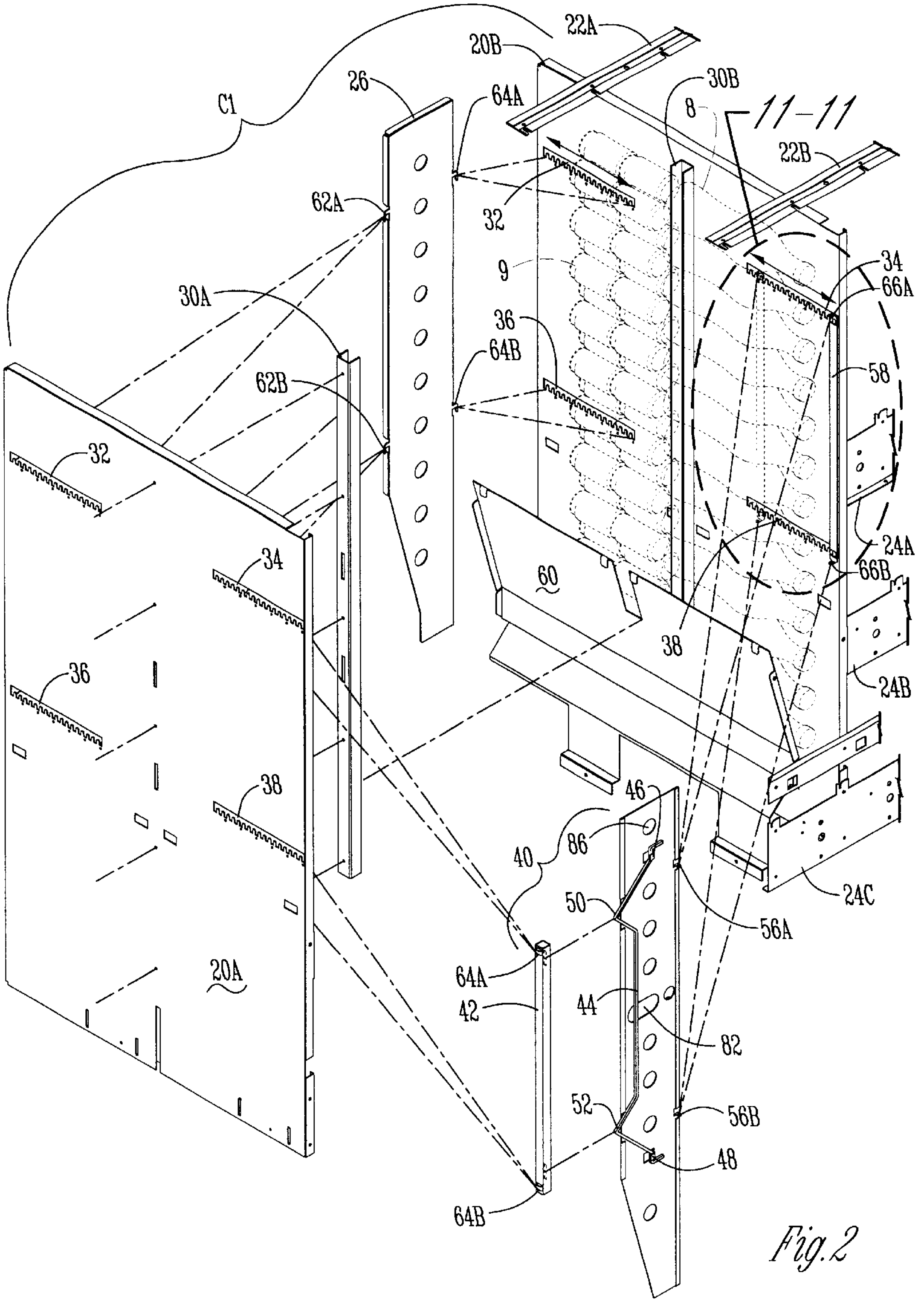
FIG. 2 is similar to FIG. 1 except shows FIG. 1 in an exploded view and also shows in ghost lines plural vertical stacks of vendable containers in a column.

FIG. 2 illustrates column Cl of FIG. 1 in exploded form. In addition to the parts described in FIG. 1, FIG. 2 shows in more detail that sidewalls 20A and 20B include upper and lower toothed tracks 32, 34, 36 and 38. These tracks consist of elongated openings in the sidewalls, the bottom of which are defined by teeth.

FIG. 2 illustrates that separators 30A and 30B can be attached to the inner facing sides of sidewalls 20A and 20B by bolts through bolt holes in sidewalls 20A and 20B along essentially a vertical plane. A latch mechanism 40 for front retainer 28 includes a receiver member 42 that is adjustably positionable along tracks 34 and 38 at upper and lower ends respectively. A wire member 44 is attached at opposite free ends to tabs 46 and 48 formed in retainer 28. Peaks 50 and 52 of wire member 44 extend past the edge of retainer 28 and are adapted to fit into openings 54 A and B (see FIG. 10) in receiver member 42. The opposite edge of retainer 28 includes pivots 56A and B (see FIG. 7) which cooperate with pivot member 58 that is adjustably positionable along tracks 34 and 38 of sidewall 20B (see FIG. 11) such that front retainer 28 can be pivoted between a closed position (see retainer 28 in column Cl of FIG. 1), and an open position (see retainer 28 of column C2 of FIG. 1).

FIG. 2 also illustrates a slanted plate 60 at the bottom of column C1 that serves to converge the vertical stacks for dispension. The dispensing mechanism is not shown in detail, but would receive items from the columns and, when instructed, dispense them to a customer, as is well known.

FIG. 2 also shows that rear wall 26 includes tabs 62A and B on one side and tabs 64A and B on the other side that cooperate with tracks 32 and 36 of sidewall 20A, and tracks

32 and 36 of sidewall 20B to allow it to be adjusted forwardly and rearwardly to the extent of the length of tracks 32 and 36. This allows the rear of the columns to be adjusted for different sized containers. Note also that the lower left edges of back-wall 26 and front retainer 28 are angled to match the slanted plate 60.

Figure 12:
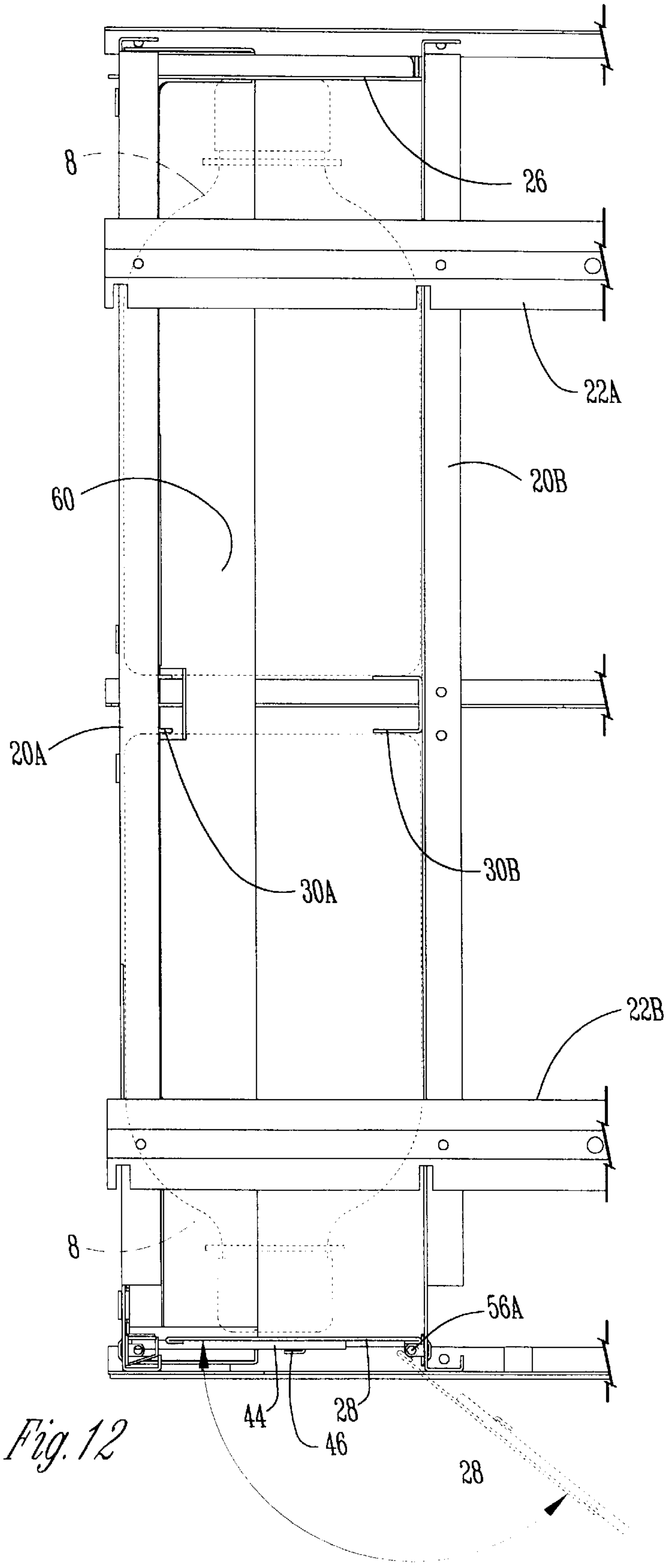
FIG. 12 is an enlarged top plan view of a column of FIG. 1 shows in ghost lines, two stacks of end to end bottles in the column.
Figure 13:
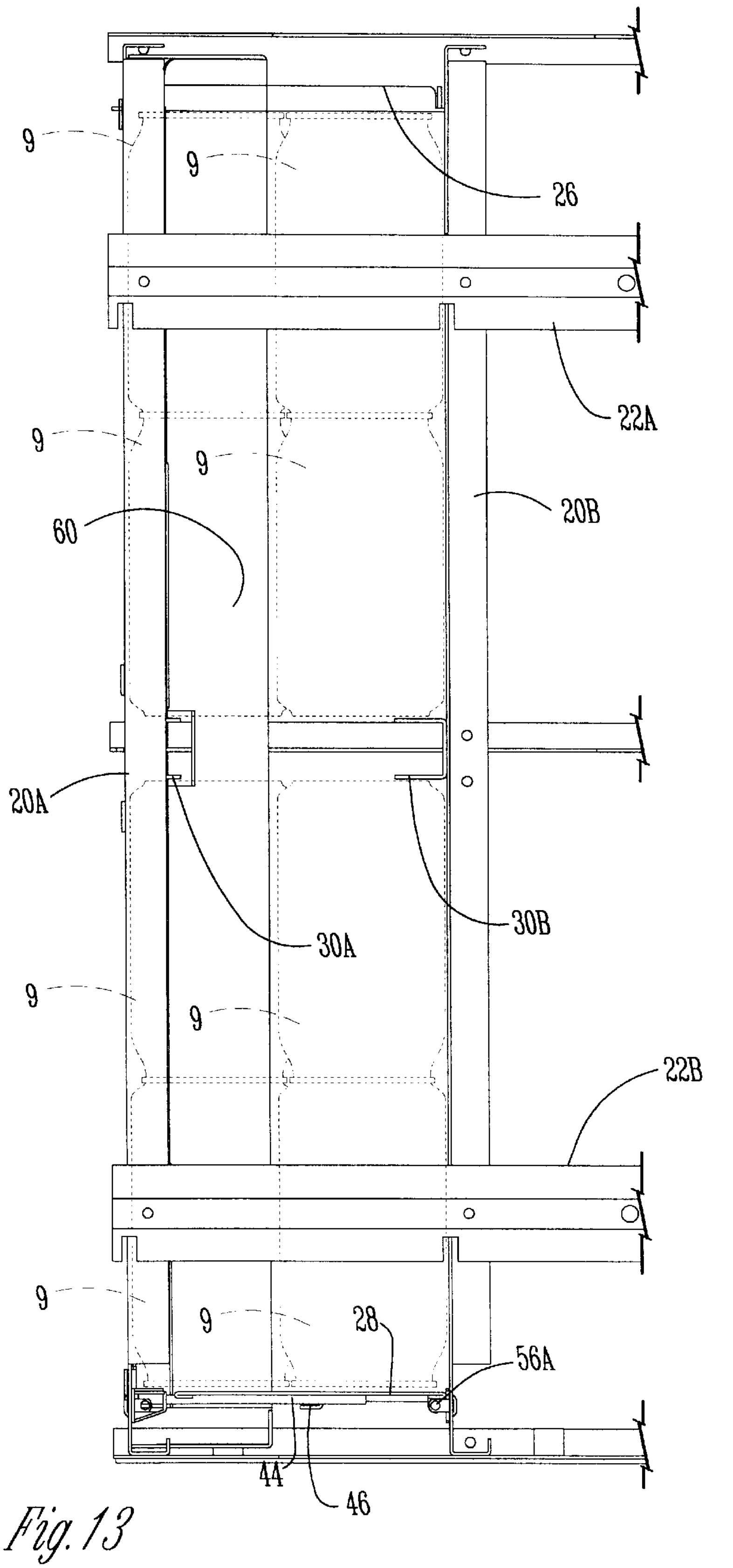
FIG. 13 is similar to FIG. 12, but shows four stacks of cans in the column.

FIG. 2 also illustrates in ghost lines how multiple a vertical stacks of containers 8 can be positioned in column C1. In this instance, essentially three vertical stacks are situated in column C1. Two of these stacks (cans 9) are behind separators 30A and 30B; one stack is ahead of separators 30A and 30B. As can be seen by referring to FIG. 2 and FIG. 12, containers 8 are held in the front section of column C1 in front of separators 30A and 30B and maintained in a vertical orientation by sidewalls 20A and 20B, separators 30A and 30B, and front retainer 28, when retainer 28 is in a first position, that is, closed across the front of column C1. Containers 9 are held generally vertical in the rear part of column C1 (behind separators 30A and 30B) by sidewalls 20A and 20B, separators 30A and B, and back-wall 26. As can be appreciated, to allow access from front to rear through the column, (between separators 30A and B and back-walls 26) the separators and retainers across the column cannot be permanently installed. Therefore, retainer 28 on hinges 56A and B, with latch mechanism 40, allows retention and maintenance of the vertical stack in the front of the column by having retainer 28 being closeable and latchable across the front of the column. If access is desired to the column, retainer 28 is unlatched and opened. Middle separators 30A and B extend inwardly towards each other enough to retain and keep items 8 and 9 in the column vertical, yet allow the vending operator to reach through separators 30A and B to the rear of the column.

Furthermore, to accommodate different sizes, types, and shapes of items 8 and 9, back wall 26 and retainer 28 are adjustable forwardly and rearwardly to set the distance between them and middle separators 30A and B. As described above, this is accomplished by having adjustable connections along tracks 32 and 36 for back walls 26 and along tracks 34 and 38 for front retainers 28.

Figure 3:
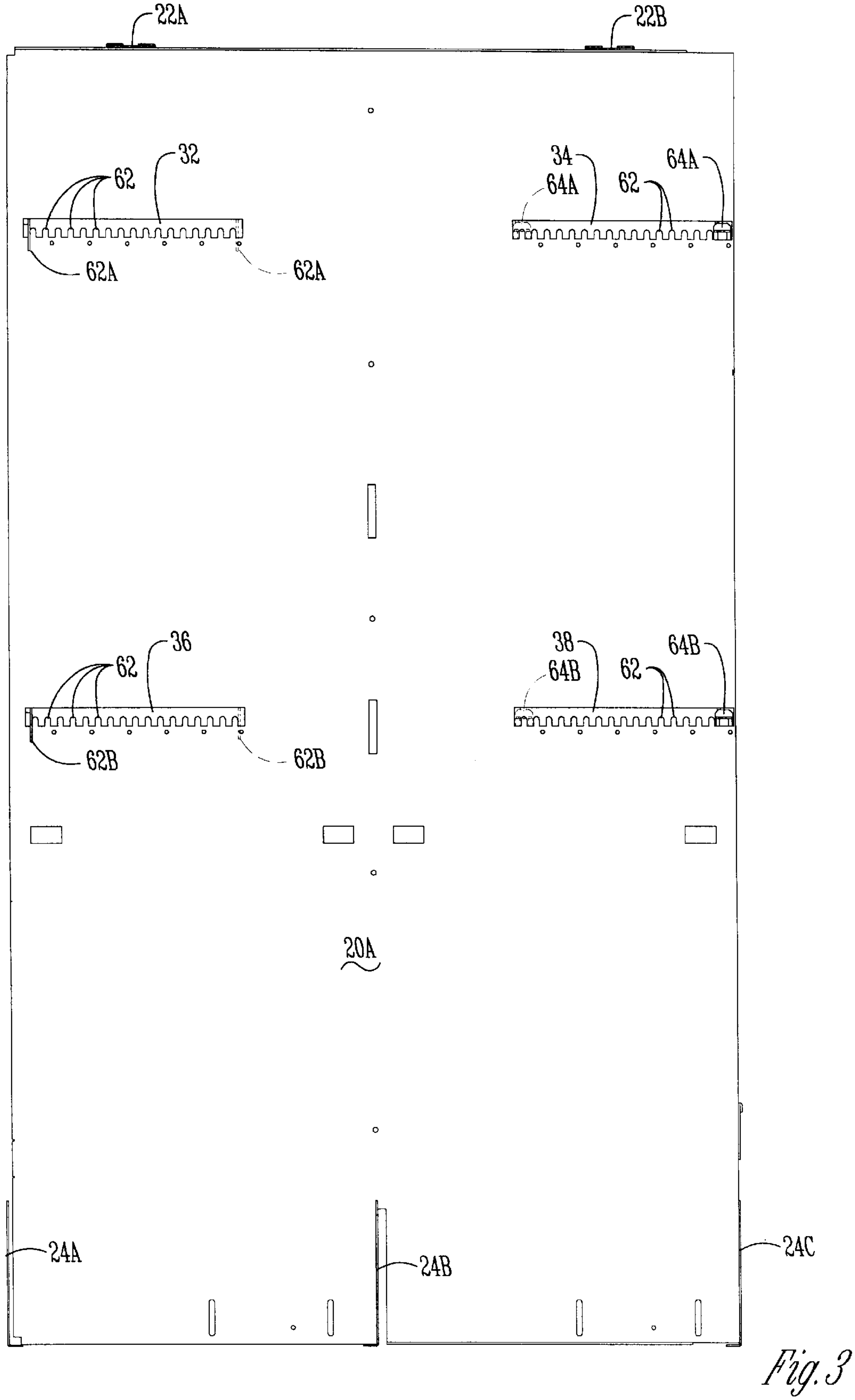
FIG. 3 is an enlarged side elevational view of a sidewall of a column of FIGS. 1 and 2.

FIG. 3 shows a side elevational view of a sidewall, (here sidewall 20A), as well as shows the attachment of one side of front retainer 28 and back wall 26. As can be seen in FIG. 3, connectors 62A and B from back wall 26 can be placed through tracks 32 and 36 respectively and essentially hook rear wall 26 in place along tracks 32 and 36. Teeth 62 along tracks 32 and 36 keep back wall 26 in place. In FIG. 3, back wall 26 is in the rearward-most position. Ghost lines 62A and 62B illustrate that back wall could be moved to the other extreme of tracks 32 and 36 to a forward-most position for smaller containers.

Similarly, FIG. 3 illustrates connection 64A and B on receiver member 42. They hook over one of teeth 62 on tracks 34 and 38 respectively and hold receiver 42 in position. In FIG. 3 connectors 64A and B show receiver 42 in a forward most position right at the front of the column. Ghost lines for connectors 64A and B are shown moved rearwardly to the other end of tracks 34 and 38, which would enable retainer 28 to be moved and latched at the position inwardly from the front of the column for smaller containers.

Figure 6:
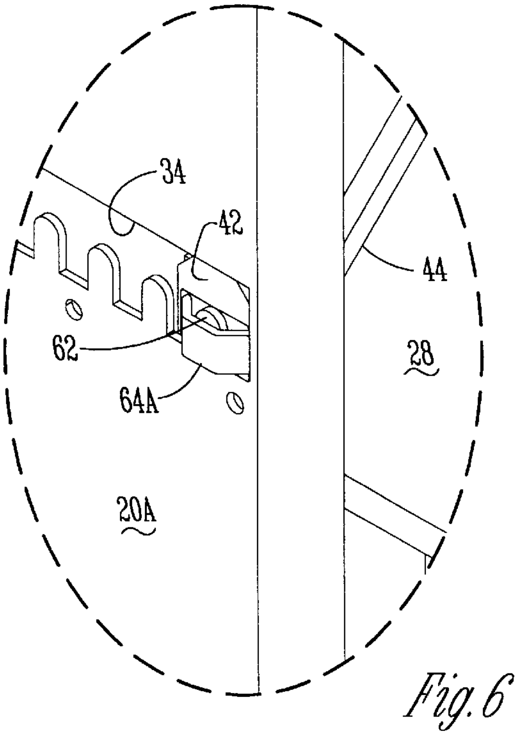
FIG. 6 is an enlarged perspective view of that portion of FIG. 1 shown at line 6—6.
Figure 10:
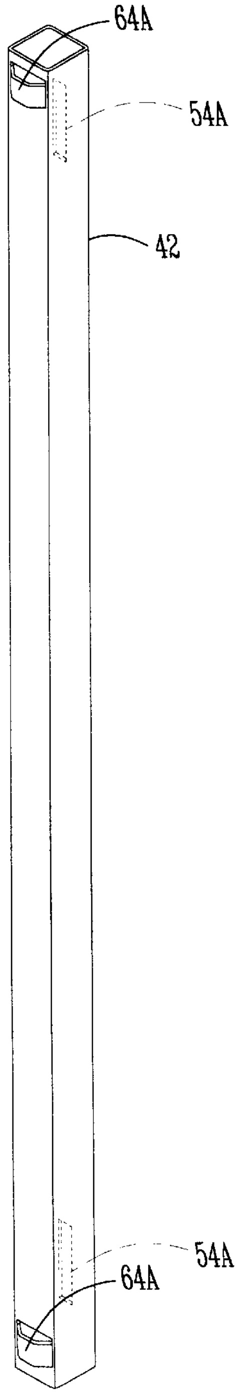
FIG. 10 is an enlarged isolated perspective view of part of the latch mechanism shown in FIG. 2.

Receiver member 42 as shown in an enlarged fashion in FIG. 10, consists of a square tubular elongated member. Connectors 64A and B are spaced apart the equivalent distance that tracks 34 and 38 are spaced apart. It can be seen how connectors 64A and B simply are placed over a tooth 62 in tracks 34 and 38 respectively and set down onto tracks 34 and 38. Receiver 42 is then held in position by gravity and it is prevented from any lateral movement by connectors 64A and B over teeth 62. (See FIG. 6 for a close-up of connectors 64A in position over to 62 on track 34).

Figure 11:
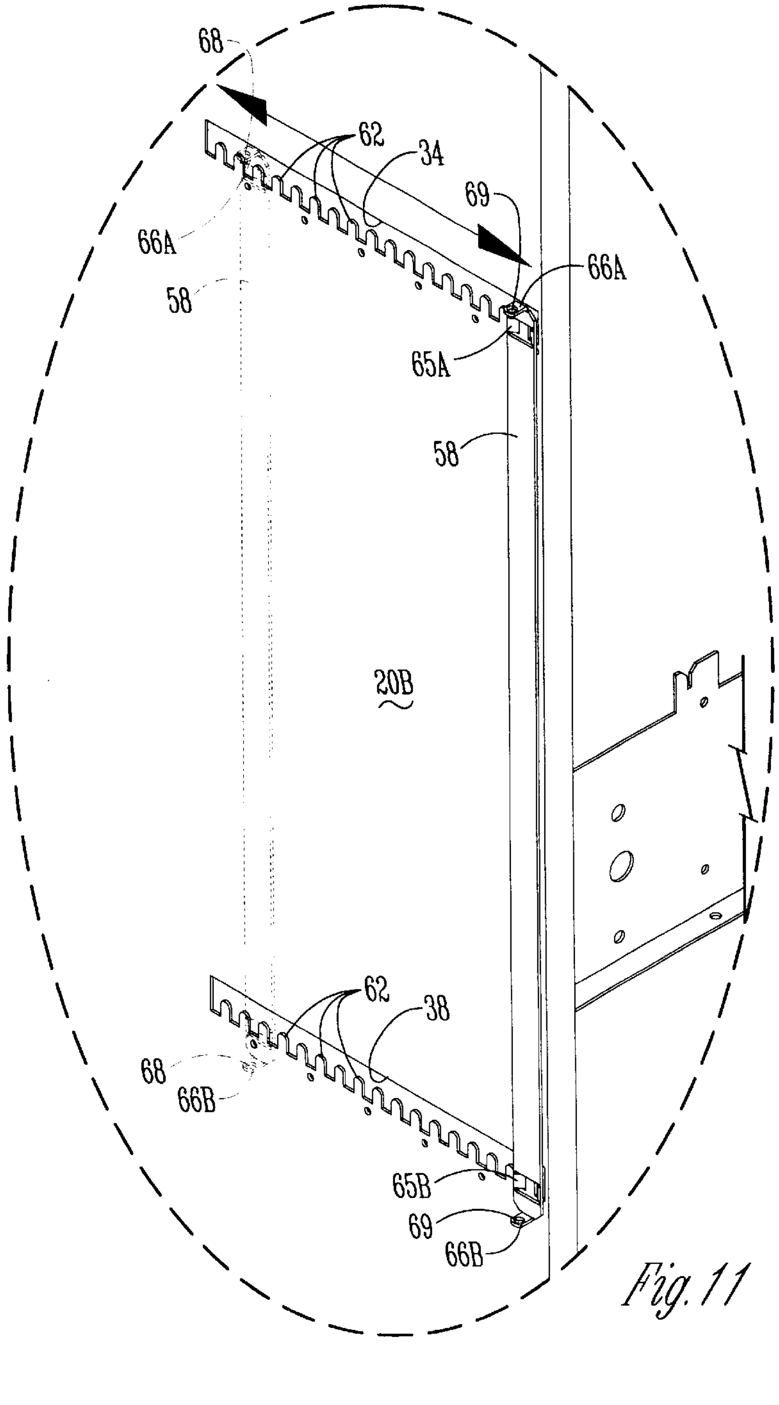
FIG. 11 is an enlarged view of that portion of FIG. 2 shown at line 11—11.

In a similar fashion, pivot member 58 could have connectors 65A and B the same or similar to connectors 64A and B spaced along pivot member 58 and adapted to be placed over a tooth 62 on tracks 34 and 38 respectively of opposite sidewall 20B (see FIG. 11). Pivot member 58 can be positioned anywhere between the very front of tracks 34 and 38 (as shown in solid lines in FIG. 11) or moved rearwardly (see for example ghost lines of part 58 in FIG. 11). Obviously, normally pivot member 58 and receiver member 42 would be coordinated with respect to their positions along tracks 34 and 38 so that when retaining member 28 is pivotally attached to pivot member 58 on one side and latched to receiver member 42 on the other side, the retainer 28 would be essentially perpendicular to sidewalls 20A and 20B.

Figure 7:
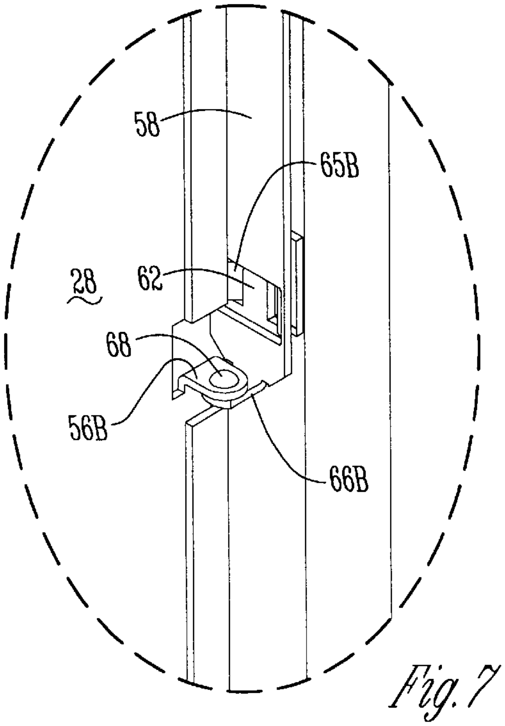
FIG. 7 is an enlarged perspective view of that portion of FIG. 1 shown at line 7—7.

FIG. 11 shows that pivot member 58 includes outwardly extending tabs 66 including holes 69. FIG. 7 shows specifically the lower pivot mechanism for retainer 28. Pivot 56B extending from retainer 28 is essentially a tab with an aperture therethrough. When the apertures in pivots 56B and 66B are aligned, with pivot 56B over pivot 66B, a rivet, bolt, or other similar fastener 68 can be inserted through the aligned apertures and form a pivot for retainer 28. A similar arrangement exists regarding top pivot 56A and pivot 66A of pivot member 58. Pivot 56A could be placed underneath tab 66A, however. Container 28 therefore would have two pivot connections along a pivot axis between apertures 69 in top and bottom tabs 66A and 66B.

Figure 4:
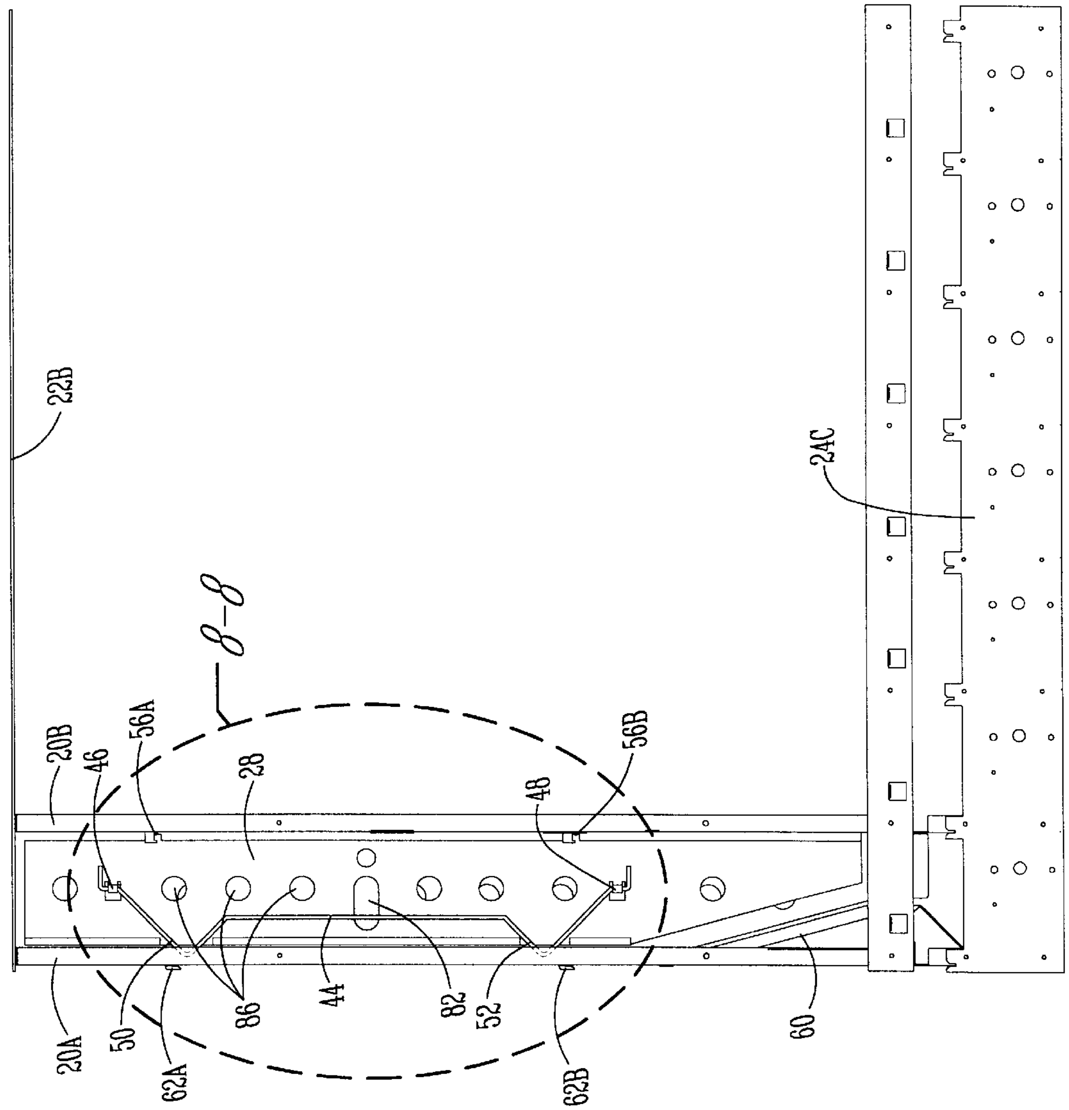
FIG. 4 is an enlarged front elevational view of one column of FIG. 1.

FIGS. 4, 5, 8 and 9 illustrate in more detail the latching mechanism 40 for retainer 28. FIG. 4 shows that, in the first position, retainer 28 substantially blocks the front of column C1 and is generally perpendicular to walls 20A and 20B. Retainer 28 is latchable into that position by wire member 44 combined with receiver member 42. As shown in FIG. 4, points 50 and 52 of wire member 44, as previously mentioned, fit into openings 54A and B (see FIG. 10) on receiver member 42. Wire 44 is connected to retainer 28 at tabs 46 and thus prevents any pivoting of retainer 28 when latched. Thus, as shown in FIG. 4, when latched, retainer 28 retains any items 8 in column C1 from moving forward past the plane at the front of column C1.

Figure 5:
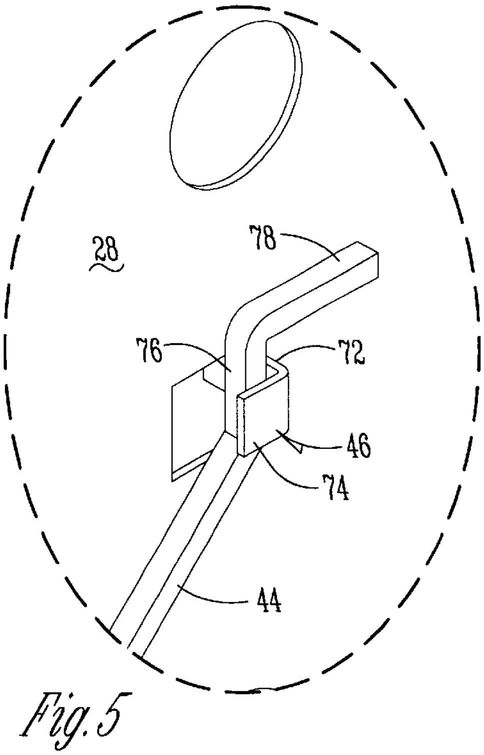
FIG. 5 is an enlarged perspective view of that portion of FIG. 1 shown at line 5—5.
Figure 8:
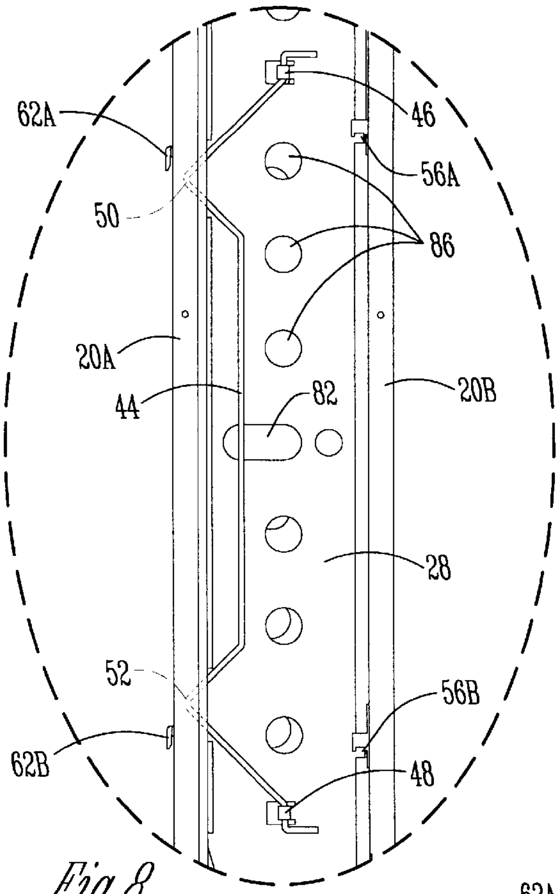
FIG. 8 is an enlarged elevational view of that portion of FIG. 4 shown at line 8—8.
Figure 9:
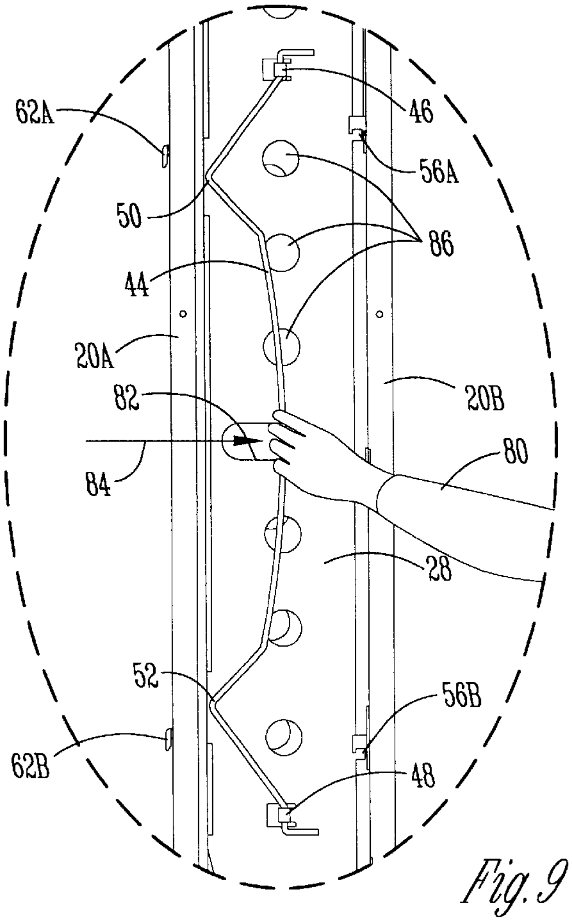
FIG. 9 is essentially similar to FIG. 8 but shows part of the latch mechanism being released.

FIG. 5 illustrates in more detail tabs 46 and the opposite ends of wire member 44. Tabs 46 are L-shaped and have a first section 72 extending outwardly from retainer 28 and a second section 74 extending perpendicularly therefrom. The outer end of wire member 44 has a first section 76 that fits within the interior of tab 46 and second section 78 that extends along the surface of retainer 28. By this arrangement, wire member 44 is easily removable from retainer 28, but once installed, lies flat against the front surface of retainer 28. As shown in FIGS. 8 and 9, when in a first position and latched, wire member 44 blocks pivoting of retainer 28. As shown in FIG. 9, a vending operator grabs wire member 44 approximately at its mid-point (access is made easier by slot 82 in retainer 28). The vending operator's hand 80 then pulls the middle of wire member 44 in the direction of arrow 84. This will also pull points 50 and 52 of wire member 44 in the same direction of arrow 84. When pulled sufficiently, points 50 and 52 will be fully removed from openings 54A and B in receiver member 42. At this point, vending operator can unlatch front retainer 28 and pivot retainer 28 from the first position and open it to substantially unblock the front of column C1.

Pivot member 58 is thin in width (less than ¾"). Tabs 66A and B extending outwardly from pivot member 58 are short in length (less than ½"). Similarly, tabs 56A and B on retainer 28 are short in length (less than ½") Therefore, the pivot axis for retainer 28 is very close to the plane of sidewall 20B. When retainer 28 is open, it, therefore, almost completely, unblocks the entire width of column C1. This is true even if retainer 28 is positioned inwardly along tracks 34 and 38. Retainer 28 can be opened at least basically parallel to sidewall 20B, and relatively close to the plane of sidewall 20B.

Therefore, it can be seen that the above described arrangement allows for maintenance of verticality of vertically stacked items 8 and 9 for dispension at all parts of each column. Adjustments can be made for different sized containers. When the vending operator needs to stock a column, retainer 28 is opened completely (see retainer 28 for column C2 in FIG. 1). Normally the vending operator would stock column C2 by stacking items 9 in the rear-most part of column C2. Separators 30A and 30B allow the operator to reach through to the back. Wall 26 would be adjusted to accommodate the size, shape, and type of containers being stacked in that rear part of column C2. (see FIG. 12) As shown in Figure C2, rear wall 26 can easily and simply be moved along tracks 32 and 36 in sidewalls of the column by lifting rear wall 26 up and sliding it forward or backward along tracks 32 and 36 in each sidewall. Once the position is selected, rear wall 26 is moved downwardly to seat connectors 62A and B and connectors 64A and B on selected teeth 62 of tracks 32 and 36. Separators 30A and 30B are secured in a fixed position in the columns.

The front part of column C2 can then be stocked with containers 8 with full access to the column because the pivot axis of retainer 28 is very close to the plane of the right sidewall of the column. Once stocked, the column is closed off by moving retainer 28 to its first position and latching retainer 28 in place. Wire member 44 is pulled backwardly (see FIG. 9), retainer 28 brought to the first position, and then wire member 44 released so that points 50 and 52 enter openings 54A and 54B in receiver 42.

Prior to stocking the column, the position of retainer 28 is selected for the size of item 8 that is to be stocked in the front of the column by positioning pivot member 58 and receiver member 42 along tracks 34 and 38 on each sidewall of the column as previously explained.

When a column is to be restocked, changed over, or otherwise accessed, the vending operator opens front door 18 of vending machine housing 12 and for the selected column unlatches retainer 28 and pivots it away from its first position.

The included preferred embodiment is given by way of example only, and not by way of limitation to the invention, which is solely described by the claims herein. Variations obvious to one skilled in the art will be included within the invention defined by the claims.

For example, pivot member 58 and receiver member 42 could be reversed for each column. Different latch mechanisms could be utilized. The precise shape and structure of retainer 28 can vary. In the preferred embodiment, retainer 28 is made of metal. Openings 86 along member 28 allows vending operator to see the level of vertical stack in the column and the type of item in the column without having to open retainer 28. However, the openings 86 would not allow passage of an item through openings 86 are not necessary.

Also, as can be appreciated, the invention is applicable for either one item in one vertical stack in a column or several vertical stacks in a column side by side, or several vertical stacks in a column end to end, with several vertical stacks side by side and end to end in a column. The invention can be used without separators like 30A or 30B and without an adjustable back wall 26. If access to the columns is from the rear of housing 12, retainer 28 could be installed at the rear of the columns.

What is claimed:

1. A vending machine article stack retainer comprising:

a column defined by spaced apart vertical sidewalls and a front and back;

a door connected to one sidewall at or towards the front of the column;

the door movable between a first position at least substantially spanning the column and a second position substantially exposing the column;

a latch on a side of the door opposite its sidewall connection and associated with the other sidewall;

a receiver and insertion member, one of which is on the door and the other on a sidewall;

said one or the other of said receiver and insertion member on the sidewall being adjustably moveable along the sidewall, comprising an elongated member with spaced apart openings therealong.

2. The retainer of claim 1 wherein the column is stacked with vending items between front and back of the column and the door provides access to the column.

3. The retainer of claim 1 further comprising two, end to end stacks along the said walls and a separator between the stacks.

4. The retainer of claim 1 wherein the insertion member comprises a structure that includes members that are insertable into openings in the receiver member.

5. The retainer of claim 4 wherein the members are manually retractable.

6. The retainer of claim 1 further comprising a vertical wall at least substantially spanning the back of the column.

7. The retainer of claim 6 wherein the vertical wall at the back of the column is adjustable forwaerdly or rearwardly relative to the column.

8. The retainer of claim 1 wherein the insertion member comprises a structure that includes members that are insertable into openings in the receiver member.

9. The retainer of claim 8 wherein the members are manually retractable.

10. A vending machine article stack retainer comprising:

a column defined by spaced apart vertical sidewalls and a front and back;

a door connected to one sidewall at or towards the front of the column;

a hinge on a first sidewall, the door being connected to the hinge which is adjustably movable along the sidewall on generally parallel tracks in the sidewall towards and away from the front of the column;

the door movable between a first position at least substantially spanning the column and a second position substantially exposing the column.

11. The retainer of claim 10 further comprising two, end to end stacks along the sidewalls and a separator between the stacks.

12. The retainer of claim 10 wherein the column is stacked with vending items between front and back of the column and the door provides access to the column.

13. The retainer of claim 10 wherein the tracks include teeth and a hinge connection is removeably positionable along the teeth.

14. The retainer of claim 10 further comprising a vertical wall at least substantially spanning the back of the column.

15. The retainer of claim 14 wherein the vertical wall at the back of the column is adjustable forwardly or rearwardly relative to the column.

16. A vending machine comprising:

a housing having opposite side, back, top, and bottom walls defining an interior space and having a front door pivotably enclosing the interior space and exposing the interior space;

a dispensing control;

a selection control;

a plurality of vertical columns defined by spaced apart generally parallel vertical sidewalls extending generally between front and back of the interior space of the housing;

the columns adapted to retain generally vertical stacks of vendable products;

a door connected to one sidewall at or towards the front of each column;

a hinge on a first sidewall, the door being connected to the hinge which is adjustably movable along the sidewall on generally parallel tracks in the sidewall towards and away from the front of the column;

the door movable between a first position at least substantially spanning the column and a second position substantially exposing the column.

17. The vending machine of claim 16 wherein the vertical sidewalls of each column are adjustable in width.

18. The vending machine of claim 16 wherein a column is adapted to retain vendable products one row deep.

19. The vending machine of claim 16 wherein a column is adapted to retain vendable products a plurality of rows deep.

20. A bottle and/or can vending machine stack retainer comprising:

a member extending substantially across the front or towards the front of a column in a first position to maintain a stack of vendable products substantially vertical during storage and dispension;

the member being connected to a first of a pair of sidewalls defining the column at or towards the front of the column;

a hinge on a first sidewall, the member being connected to the hinge which is adjustably movable along the sidewall on generally parallel tracks in the sidewall towards and away from the front of the column;

the member being movable from the first position to a second position to substantially open access to the column to allow restocking, maintenance, and other tasks.

21. A method of maintaining vertically stacked bottle and/or can vendable products in a vending machine comprising:

hingedly connecting a member to a first sidewall at or towards the front of the column defined by spaced apart first and second sidewalls;

adapting the member to be adjustably movable along the sidewall on generally parallel tracks in the sidewall towards and away from the front of the column;

substantially blocking a column of vertically stacked items during storage and dispensing of the items; substantially unblocking a column for reloading, maintenance or other tasks on the column or items.

22. The method of claim 21 further comprising adjusting blocking of front and back of the column.

23. The method of claim 21 further comprising plural stacks from back to front in the column.

24. The method of claim 23 further comprising partially blocking but still allowing access to the back part of the column.

25. The method of claim 23 further comprising blocking the back of the column.

* * * * *

UNITED STATES PATENT AND TRADEMARK OFFICE

CERTIFICATE OF CORRECTION

PATENT NO. : 6,302,293 B1
DATED : October 16, 2001
INVENTOR(S) : Francis A. Wittern, Jr. and Paul L. Hawkins It is certified that error appears in the above-identified patent and that said Letters Patent is hereby corrected as shown below:

Column 8,
Line 23, please insert -- the receiver -- after the word "sidewall,".
Line 29, please delete "said walls" and substitute -- sidewalls --.
Line 39, please delete "forwaerdly" and substitute -- forwardly --.

Signed and Sealed this

Seventh Day of May, 2002

*Attest:*

JAMES E. ROGAN
*Director of the United States Patent and Trademark Office*

*Attesting Officer*